United States Patent
Miloslavsky

Patent Number: 6,128,646
Date of Patent: *Oct. 3, 2000

[54] SYSTEM FOR ROUTING ELECTRONIC MAIL TO BEST QUALIFIED PERSON BASED ON CONTENT ANALYSIS

[75] Inventor: Alec Miloslavsky, San Carlos, Calif.

[73] Assignee: Genesys Telecommunications Laboratories Inc., San Francisco, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/998,268

[22] Filed: Dec. 24, 1997

[51] Int. Cl.$^7$ ............................ G06F 15/16; G06F 15/173
[52] U.S. Cl. .......................... 709/206; 709/203; 709/205; 709/218; 709/219; 379/93.15; 379/93.17; 379/93.24; 379/89.2; 358/402; 370/351
[58] Field of Search ..................................... 709/206, 203, 709/205, 218, 219, 223, 225, 226, 242; 379/93.24, 93.17, 89.2, 93.15, 100.08, 980, 900, 100.13, 272, 265, 260, 201; 358/402; 370/351, 358

[56] References Cited

U.S. PATENT DOCUMENTS

| | | | |
|---|---|---|---|
| 4,763,317 | 8/1988 | Lehman et al. | 370/358 |
| 5,392,277 | 2/1995 | Bernstein | 370/399 |
| 5,426,594 | 6/1995 | Wright et al. | 709/206 |
| 5,497,317 | 3/1996 | Hawkins et al. | 705/37 |
| 5,659,746 | 8/1997 | Bankert et al. | 707/205 |
| 5,724,418 | 3/1998 | Brady | 379/212 |
| 5,760,823 | 6/1998 | Brunson et al. | 348/14 |
| 5,790,789 | 8/1998 | Suarez | 709/202 |
| 5,793,861 | 8/1998 | Haigh | 379/266 |
| 5,826,269 | 10/1998 | Hussey | 701/29 |
| 5,862,223 | 1/1999 | Walker et al. | 380/25 |
| 5,867,495 | 2/1999 | Elliot et al. | 370/352 |
| 5,872,926 | 2/1999 | Levac et al. | 709/206 |
| 5,884,032 | 3/1999 | Bateman et al. | 709/204 |
| 5,974,135 | 10/1999 | Breneman et al. | 379/265 |
| 5,991,365 | 11/1999 | Pizano et al. | 379/88.13 |
| 5,999,609 | 12/1999 | Nishimura | 379/201 |
| 5,999,965 | 5/2000 | Kelly | 709/202 |
| 6,058,435 | 5/2000 | Kelly | 709/202 |

OTHER PUBLICATIONS

@INGate: Integrating Telephony and Internet, Hoffman, P.; Ruffler, D.; Rebensburg, M.; Simenonv, P., PSP–PV/PRZ, Tech Univ. Berlin, Germany, Nov. 24–27, 1997.

Primary Examiner—Zarni Maung
Assistant Examiner—Beatriz Prieto
Attorney, Agent, or Firm—Donald R. Boys; Central Coast Patent Agency

[57] ABSTRACT

A system for routing electronic mails to one of a plurality of support persons in a processing center is disclosed. Each person has a skill set that is suitable for responding to a certain type of e-mails. The system comprises an e-mail server for receiving the e-mail from a sender, an information extractor for extracting relevant information from the e-mail, and a router for routing the e-mail. The system contains a database for storing information related to all persons who can answer e-mails. The system also contains a server for storing the history of all activities in the system. The router can make routing decisions and perform load-balancing and alert functions based on the information stored in the database and the server.

10 Claims, 3 Drawing Sheets

SYSTEM FOR ROUTING ELECTRONIC MAIL TO BEST QUALIFIED PERSON BASED ON CONTENT ANALYSIS

FIELD OF THE INVENTION

The present invention relates to electronic mails, and more particularly to a system for routing electronic mails to the best qualified person who can answer the mail.

BACKGROUND OF THE INVENTION

Electronic mail (e-mail) has recently become one of the most commonly used communication tool in business. As more and more homes are connected to the Internet, it could become an important communication tool for homes also.

In the simplest case, electronic mail is the delivery of text-based messages from a sending computer to one or more recipient computers. The sending and recipient computers are connected to a data network. Typically, the message is temporarily stored in a server of the data network. The recipient computers (users) can retrieve the stored messages at their convenience.

Many users find that sending e-mails is more convenient than sending letters. The user can type a few lines on a computer, enter a simple e-mail address, press a button, and the message is sent. There is no need to print out the message, put it in an envelope, write a long address, and deliver the letter to a mail-box. This is especially important when the user is traveling because he/she may not have access to printers, envelopes, stamps, and mail-boxes. Because of the convenience, people tend to write a lot of e-mails, which promote communication. The increased communication improves efficiency, which tends to have a positive effect on profitability of a company.

Although many companies recognize the benefits of e-mails, some of them have installed e-mail systems only recently. This is because e-mail systems in the past were proprietary systems. Messages can only be delivered in such systems if the senders and recipients use the same proprietary system. The proprietary nature of these e-mail systems means that each system can only be accessed by persons associated with the same organization (such as a company or an on-line service provider). It is very difficult to send messages to an intended recipient outside of the system. Thus, a message can only reach a relatively small number of computers (i.e., users). Unless the company has many employees, the costs of setting up an e-mail system may be much higher than the anticipated benefits.

More recently, many companies and homes have been connected to the Internet, which is a world-wide open data network connecting tens of millions of computers. One of the reasons for the Internet's popularity is that the cost of accessing the Internet is very low. Another reason is that the Internet offers many resources in addition to e-mails. Each user of the Internet is assigned an e-mail address that is recognizable around the world. A computer connected to the Internet can send e-mails to any one of these e-mail addresses. As a result, it is possible to communicate electronically with many people at any time.

As a result of the popularity and convenience of e-mails, many companies allow their customers to send comments and request information and services using e-mails. Typically, these companies set up one or more specific e-mail addresses for these purposes. These mails are typically answered on a first come first serve basis.

It has been found that many of these mails are lost or unanswered. There are many reasons for this problem. One reason is that the person who is supposed to process an e-mail may not be familiar with the subject matter of the e-mail. Thus, this e-mail is left unanswered. One solution is for the person to forward the e-mail to another person who may be more familiar with the subject matter. This increases data traffic and work-load for everyone. Further, there is no guarantee that the intended recipient is available to reply to the e-mail. Consequently, there is a need to have a more efficient system to handle this problem.

SUMMARY OF THE INVENTION

The present invention involves a system for routing an e-mail to one of a plurality of support persons in a processing center. Each support person has a skill set that is suitable for responding to a certain type of e-mails. Thus, it is more efficient to route the e-mail to an available person who is best qualified to answer the mail. The system comprises an e-mail server for receiving the e-mail from a sender, an information extractor for extracting relevant information from the e-mail, and a router for routing the e-mail. In one embodiment of the invention, the system contains a database for storing information related to all persons who can answer e-mails. The system also comprises a statistic server (also called stat-server) for storing the history of all activities in the system. The router can make routing decisions based on the information stored in the database and the stat-server.

These and other features of the present invention are disclosed in the following description of the invention together with the accompanying drawings.

DETAILED DESCRIPTION OF THE INVENTION

The present invention comprises a novel routing system for electronic mails and related methods. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
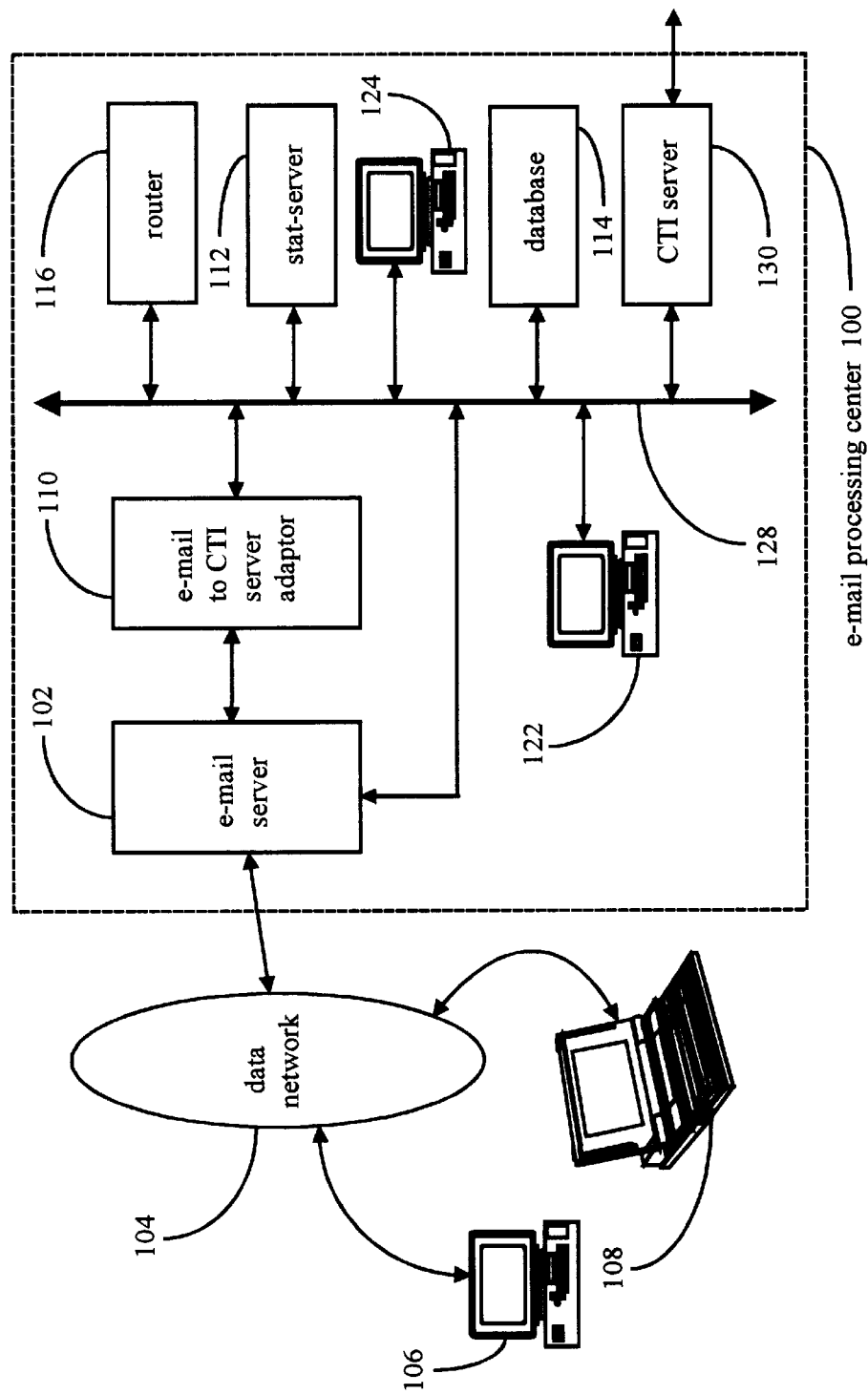
FIG. 1 is a block diagram showing an e-mail processing center of the present invention.

FIG. 1 is a block diagram showing an e-mail processing center 100 of the present invention. Processing center 100 contains an e-mail server 102 which is connected to a data network 104. Data network 104 could be a local area network or a wide-area network (such as the Internet or an intranet). Other data processing devices, such as computers 106 and 108, are also connected to data network 104. All the data processing devices can send e-mails to each other. As a result, some of the e-mails are sent to e-mail server 102.

As an example, it is assumed that one of the addresses associated with e-mail server 102 is "support@abc-company.com". This is an address for customers of a company named "ABC" to send in questions regarding products and services provided by the company. It is anticipated that the subject matter of the e-mails are diverse and the number of mails is large. For example, the e-mails may relate to all aspects of the products and services offered by ABC. Some of the e-mails may contain technical questions of a product. Other e-mails may report a bug in software sold by ABC. A few e-mails may contain suggestions on improving the products and services. If support persons of ABC are assigned to answer some of the e-mails on a first come first served basis, it would be very difficult for them to do so because it is almost impossible for a single person to know everything about ABC.

One aspect of the present invention is a system for automatically routing the e-mails to the most qualified and available support persons. For example, a support person may be an expert in one product of ABC. All e-mails related to this product will be routed to this person automatically. Further, the system can distribute the load so that every support person receives approximately the same number of e-mails. As a result, the problems of the prior art systems can be solved.

Note that the criteria for determining whether a support person is available is not limited to e-mail activities. This is because the same support person may provide telephone and facsimile support to customer inquiries. Thus, the availability of a support person may involve a combination of activities involving telephone, facsimile, e-mail, data processing, etc.

Processing center 100 contains a server 112 that records all activity in the center. For example, it contains records of who are present in the center at a particular time and are available for service, as well as records of all e-mails that are pending and have been processed by center 100. Server 112 is called herein the "stat-server." It should be noted that many types of information can be recorded, and the choice of information is determined on a case-by-cased basis.

Processing center 100 also contains a database 114 that contains detailed information on each support person, products, and customers. Information of support persons includes their skill set (e.g., product expertise, written language ability) and prior relationship with customers. Information on customers (based on the incoming e-mail address) includes the content of their previous e-mails, the products they bought, their physical addresses (obtained from product registration information), etc.

Processing center 100 also contains a router 116. This router selects the most qualified and available support person to respond to a particular e-mail based on one or more algorithms (or scripts). Various factors in a routing strategy will be described below.

In one embodiment of the present invention, database 114, router 116 and stat-server 112 could be a database, router and stat-server commonly used in telephony call centers. The advantage of this embodiment is that database, router and stat-server software for telephony applications are well developed and widely available. The use of existing software (or slightly modified versions) could speed up product development time. In telephony applications, a server is used to provide computer telephony integration (CTI) by controlling an automatic call distributor (a telephony hardware device for controlling telephone communication between the public telephone networks and telephones inside a call center) and communicating with a database, router and stat-server. This server is called herein the CTI-server. One of the functions of the CTI server is allowing automatic call distributors of different vendors to be used with the same database, router and stat-server.

In this embodiment, a CTI-server 130 and an e-mail-to-CTI-server adapter 110 is preferably included. As explained above, CTI-server 130 provides a common interface for communicating with database 114, router 116 and stat-server 112 via a digital communication network 128. Because these software products are based on telephony applications, some of the attributes used therein may not be exactly the same as that used in e-mail applications. For example, the attribute of "telephone number" in telephony applications is not used in e-mail applications. Similarly, the e-mail attribute of "sender's e-mail address" may not be recognizable in telephony applications. These two attributes have similar characteristics, and can be used interchangeably provided that they are formatted and used properly. One of the functions of adapter 110 is to provide conversion between e-mail attributes and telephony attributes.

Figure 2:
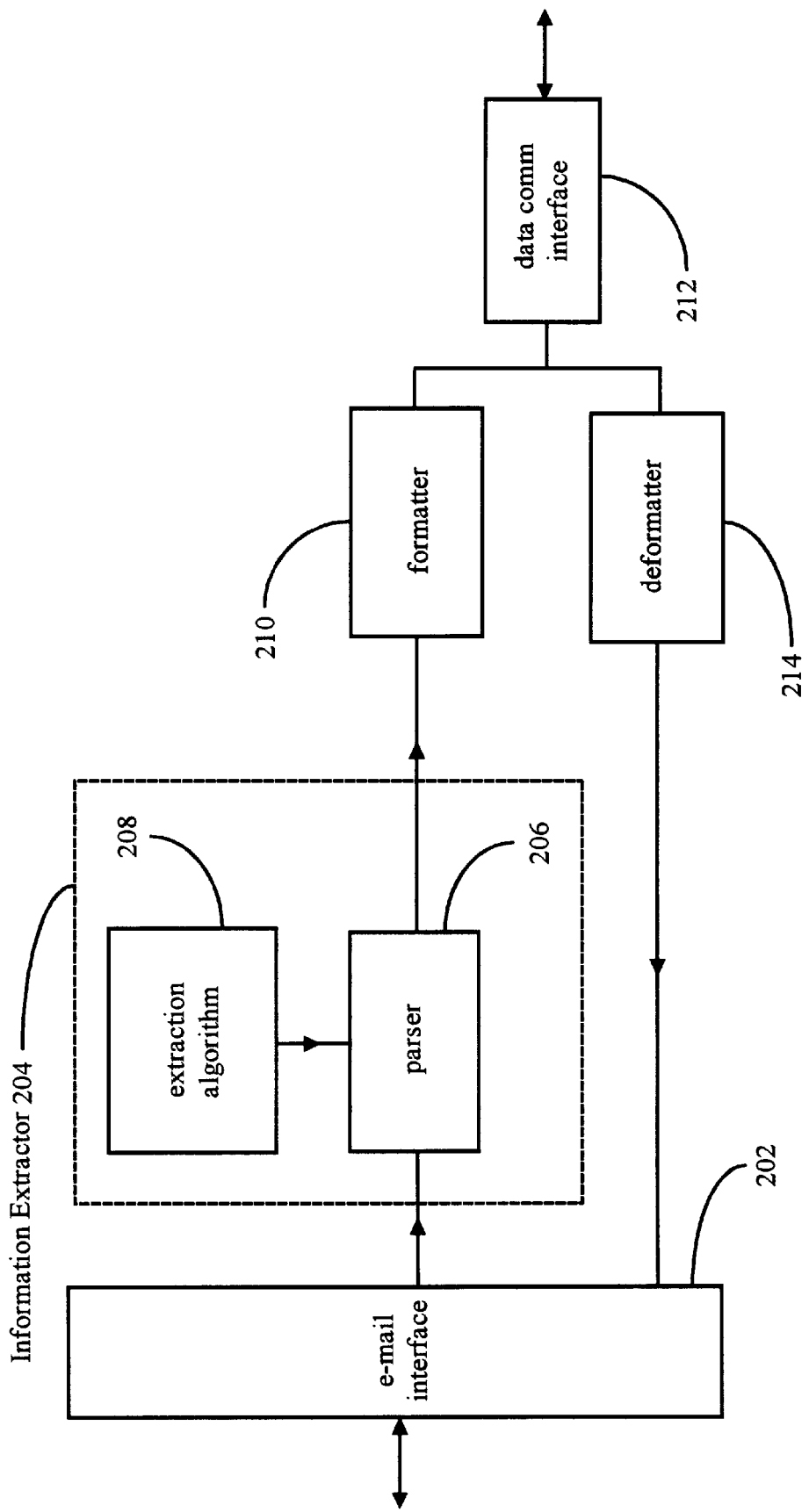
FIG. 2 is a block diagram of an e-mail to CTI server adapter used in the e-mail processing center of the present invention.

FIG. 2 is a block diagram of e-mail-to-CTI-server adapter 110. It includes an e-mail interface 202 for sending data to and receiving data from e-mail server 102. Adapter 110 also includes an information extractor 204 for extracting relevant information from e-mails. Extractor 204 contains a parser 206 for parsing the content of the e-mails obtained from e-mail server 102. Extractor 204 also contains a storage device for storing an algorithm 208 which directs parser 206 to extract appropriate information from the content of the e-mails in accordance with predetermined criteria. The extraction algorithm in extractor 204 is changeable because the coding in algorithm 208 could be changed. Examples of relevant information are:

(a) Addresses: Typically, an e-mail has a portion that contains the addresses of the sender and recipient. Extractor 204 directs parser 206 to extract these e-mail addresses.

(b) Time Stamp: Some e-mail contains the date and time an e-mail is sent. Extractor 204 could direct parser 206 to extract this information. This information may be more accurate than the time e-mail server 102 receives the e-mail because some e-mails may be delayed for more than a day due to network problems.

(c) Keyword: The Extractor may direct the parser to conduct a keyword search on the content of the e-mails. Examples of keywords are name of relevant products and services provided by the company., special words such as "bugs," "virus", "crash" (for software products), "overheat" and "electric shock" (for hardware products), and words of urgent nature (such as "urgent", "ASAP", and "fast").

Adapter 110 contains a formatter 210 for formatting the relevant information into attributes that can be understood by CTI-server 130. As an example, the sender's e-mail address could be formatted as a caller's telephone number (which is a telephony attribute). The formatted attribute is sent to a data communication interface 212 which communicates the attributes to CTI server 130 via communication network 128.

Adapter 110 also contains a deformatter 214 that accepts data and commands from CTI-server 130 and translate them to a form understood by e-mail server 102. As explained below, router 116 may send (via CTI-server 130) commands to e-mail server 102. Returning now to router 116, some examples of support person selection criteria are:

(a) the product expertise of the support person;
(b) language ability of the support person,
(c) activities the support person (e.g., how many e-malls have this person processed and how many are pending);
(d) work load of other support persons in the center (for load balance among various support persons);
(e) the language of the incoming e-mail;
(f) the subject matter of the incoming e-mail;
(g) information about the sender;
(h) overall activities of the center (e.g. whether the support persons need to process jobs other than e-mails); and
(i) the urgency of the matter.

Processing center 100 contains a number of computer terminals, such as computers 122 and 124, managed by support persons. When a support person starts 15 to work, he/she logs in so that stat-server 112 knows who is working in center 100 and how to reach the support person. Router 116 obtains information to make selection decisions from stat-server 112 and database 114. Once a decision is made, router 116 sends a command to e-mail server 102 to route the e-mail to the selected computer terminal. The support person responds to the e-mail and sends the reply to e-mail server 102, which delivers the reply to the sender via data network 104.

Figure 3:
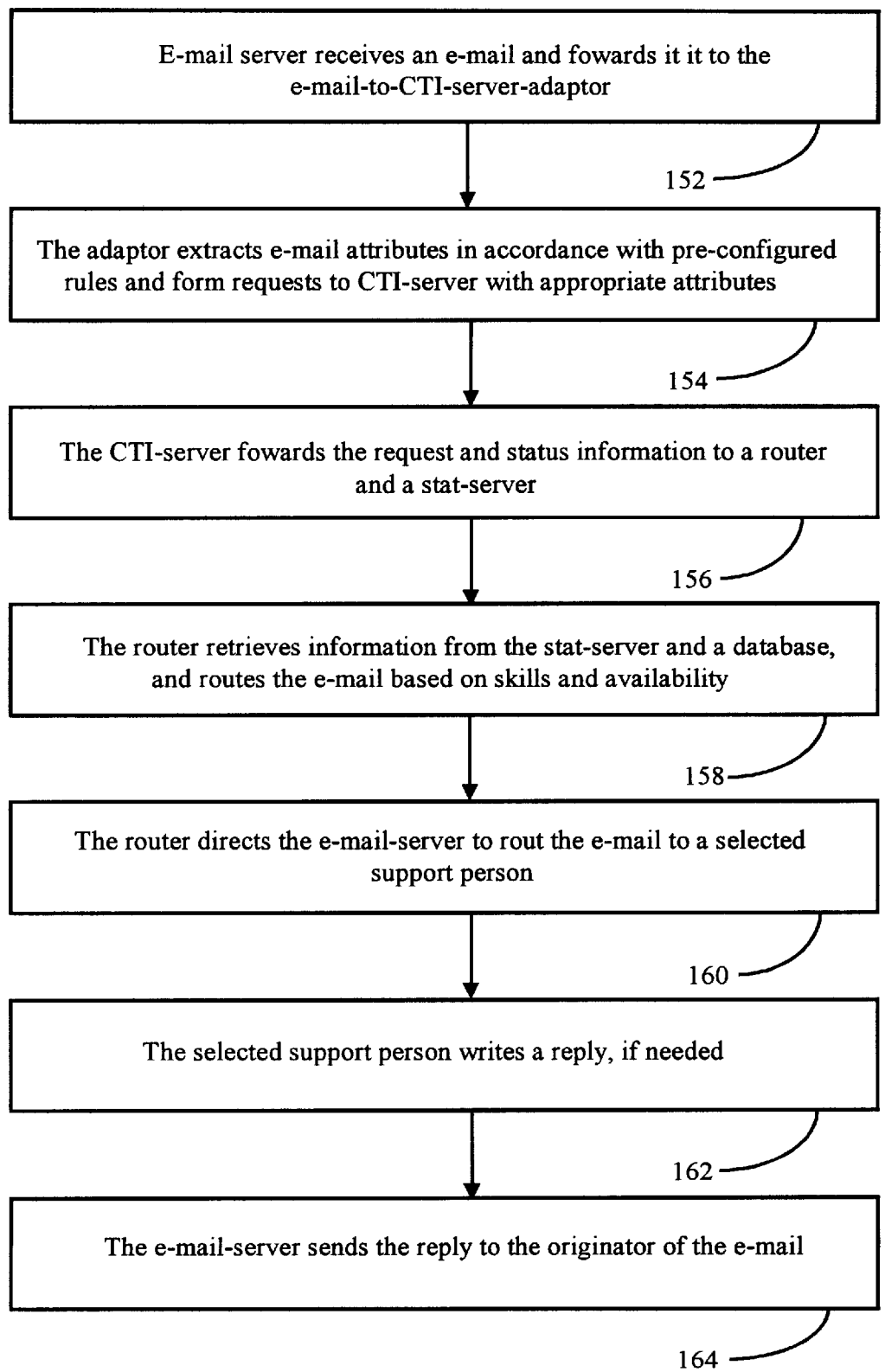
FIG. 3 is a flow chart showing operation of the server adapter used in the e-mail processing center of FIG. 1.

A flow chart 150 showing the operation of e-mail processing center 100 is shown in FIG. 3. In step 152, e-mail server 102 receives an e-mail. The e-mail is forwarded to e-mail-to-CTI-server adapter 110. In step 154, adapter 110 extracts e-mail attributes in accordance with pre-configured rules (embodied in extraction algorithm 208). It also sends status information and formulates requests to CTI server 130 using appropriate extracted attributes. In step 156, CTI-server 130 forwards the request and status information to router 116 and stat-server 112. In step 158, router 116 retrieves information from stat-server 112 and database 114 so as to make routing decision. In step 160, router 116 instructs e-mail server 102 to route the e-mail to the computer terminal used by a selected support person, such as computer 122. Because the instructions from router 116 may be coded in telephony-related commands, these instructions may need to pass through CTI-router 130, deformatter 210 and e-mail interface 202. Upon receiving the e-mail, the support person processes the e-mail using computer 122. If there is a need to send a reply, the support person writes the reply (step 162), and directs e-mail server 102 to deliver the reply to a recipient connected to data network 104 (step 164).

In addition to providing basic routing function, router 116 may also have a strategy to handle exception situations. For example, if an incoming mail is not answered by the selected support person within a predetermined time interval (e.g., three days), the mail is re-routed to another qualified and available support person. This strategy prevents mails from being dropped. As another example, there may be times when the number of incoming mails exceeds the available resource to answer these mails (i.e., overflow). Router 116 could store these mails in a queue and direct e-mail server 102 to alert senders that it may take a little longer to receive a reply. It should be noted that if router 116, stat-server 112 and database 114 are designed strictly for e-mail applications, there is no need to have CTI server 130, formatter 210 and deformatter 214. In this case, router 116, stat-server 112 and database 114 can communicate with e-mail server 102 and information extractor 204 directly.

The invention has been described with reference to a specific exemplary embodiment thereof. Various modification and changes may be made thereunto without departing from the broad spirit and scope of the invention. The specification and drawings are, accordingly, to be regarded in an illustrative rather than a restrictive sense; the invention is limited only by the provided claims.

What is claimed is:

1. A system for receiving and routing e-mails and telephony calls in a multimedia call center having a Computer Telephony Integration (CTI) enhanced data network within the call center, the system for routing both e-mails and telephony calls comprising;

a plurality of computers connected on the data network and managed by support persons;

an e-mail server connected on the data network;

an adapter for performing conversion between e-mail attributes and telephony attributes, the adapter connected to the data network and the e-mail server;

a Computer Telephony Integration (CTI) server connected on the data network; and a telephony router connected to the data network;

characterized in that the adapter converts data between e-mail attributes and telephony attributes, and the CTI server negotiates with the router over the data network to determine a destination for the e-mail, and directs the e-mail server to forward the e-mail to one of said support persons based on the negotiation.

2. The system of claim 1 also comprising a stat-server connected to the data network, wherein stat-server records all of the activity information of the call center, and the router uses the information, at least partially, in the said negotiation with the CTI-server to determine a destination for the e-mail.

3. The system of claim 2 wherein routing of e-mails to selected support persons is load-balanced based on recorded activity stored in said stat-server of both e-mail and telephony traffic.

4. The System of claim 1 also comprising a database connected to the data network storing information regarding availability of said support persons, wherein the router uses the information, at least partially, in the said negotiation with the CTI-server to determine a destination for the e-mail.

5. The system of claim 4 wherein said database further stores information on senders of e-mails, and routing performed by said router further uses said stored information on senders of e-mails in selecting support persons to receive said e-mails.

6. The system of claim 4 wherein said database stores information about prior relationships of support persons and e-mail senders, and said router uses said relationship information in routing decisions.

7. The system of claim 1 wherein a time limit for response to e-mails by said support persons is set, and wherein e-mails not answered within said time limit are rerouted to other support persons.

8. The system of claim 1 wherein an overload threshold is set for number of e-mails to be routed, and senders of e-mails are notified of a possible delay when the threshold is exceeded.

9. The system of claim 1 wherein the support persons, after receiving the routed e-mail, reply directly to the sender of the e-mail, via the e-mail server, on a first come first serve basis.

10. A method for receiving and routing e-mails in a multimedia call center routing both e-mails and telephony calls having a Computer Telephony Integration (CTI) enhanced data network within the call center, the method for routing e-mails comprising steps of;

(a) converting e-mail attributes to telephony attributes of an e-mail received at the call center via an adapter connected to a data network, (b) negotiating a destination for the e-mail between a Computer Telephony Integration (CTI) server, and a telephony router, both being connected to the data network, (c) instructing an e-mail server to forward said e-mail to one of a plurality of computer terminals connected to the data network, at least partially based on the negotiation in step (b).

* * * * *